June 30, 1964

G. R. HEIDLER 3,139,559

HOUSING FOR PACKAGING MINIATURIZED MODULAR ELECTRICAL NETWORK ASSEMBLIES

Filed Dec. 29, 1959

3 Sheets-Sheet 1

INVENTOR.
GLEN R. HEIDLER

BY H. Walter [signature]

AGENT

INVENTOR.
GLEN R. HEIDLER
BY H. Walter Ging
AGENT

June 30, 1964 G. R. HEIDLER 3,139,559

HOUSING FOR PACKAGING MINIATURIZED MODULAR ELECTRICAL NETWORK ASSEMBLIES

Filed Dec. 29, 1959 3 Sheets-Sheet 3

INVENTOR.

GLEN R. HEIDLER

BY [signature]

AGENT 3,139,559

HOUSING FOR PACKAGING MINIATURIZED MODULAR ELECTRICAL NETWORK ASSEMBLIES

Glen R. Heidler, Paoli, Pa., assignor to Burroughs Corporation, Detroit, Mich., a corporation of Michigan Filed Dec. 29, 1959, Ser. No. 862,596
7 Claims. (Cl. 317—101)

The invention hereinafter described and claimed has to do with miniaturized electrical network assemblies, and more particularly to an improved housing for assembling into a package miniaturized electrical circuit modules such as described and claimed in the co-pending applications of Stanley Schneider entitled "Modularized Electrical Network Assembly," Serial No. 818,648, filed June 8, 1959, and Edgar O. Sprude also entitled "Modularized Electrical Network Assembly," Serial No. 860,602, filed December 18, 1959, now Patent No. 3,065,384, both assigned to the assignee of the present invention.

The miniaturized electrical network modules described in the aforesaid applications comprise a plurality of unique miniature circuit sub-assemblies nested around a heat exchanger and enclosed in a housing providing means for interconnecting the sub-assemblies into an electrical network, the leads of which are connected to terminals on an exterior end face of the assembly in position for plug-in connection to associated apparatus. The associated apparatus for so assembling these modules may be in accordance with the present invention.

The module as set forth in either of the above-identified co-pending applications is constructed as an elongated unitary structure of rectangular cross section. In the Sprude application, each corner of the module is shown as being provided throughout its length with a guideway for particular cooperation with the preferred form of the housing of the present invention when assembling the modules within the housing. These guideways are shown and described more fully in the co-pending application of Glen R. Heidler, entitled "Hinge Structure," Serial No. 860,449, filed December 18, 1959, now Patent No. 3,048,806, and assigned to the assignee of the present invention.

Accordingly, it will be understood that the principle object of the present invention is to provide a unique housing enabling the packaging of miniaturized modular electrical circuit networks into a miniaturized system assembly.

Another important object of the invention is to provide such a housing affording easy assembly and accessibility of the modules within the housing.

Still another object of the invention is to provide such a housing characterized by its light weight and rugged construction.

In accordance with the above objects and first briefly described, the invention comprises a housing structure including individual compartments for receiving individual modules of the kind set forth in the above Schneider and Sprude applications. Each of the compartments includes means for cooperating with the modules to guide them into their respective compartment in a manner maintaining connectors on the modules in alignment with connectors on a wall of each of the compartments whereby the module connectors may be interconnected with the housing connectors as the module approaches its completely inserted condition. Means are provided on the end wall of the housing to cooperate with means on the modules for forcibly drawing the modules into their completely inserted condition, and locking them there with the connectors in good electrically conductive relationship. The housing also provides means for electrically interconnecting the modules one with another and with input and output connectors on the housing. End wall members completely enclose the modules and their interconnections within the housing while providing for end portions of the heat exchangers of the modules to be connected to apparatus exterior of the housing for circulating a cooling fluid through the heat exchangers to extract the heat generated by the modules during operations.

A more complete understanding of the invention will be had from the following detailed description and by reference to the accompanying drawings, in which.

Figures 1, 2:
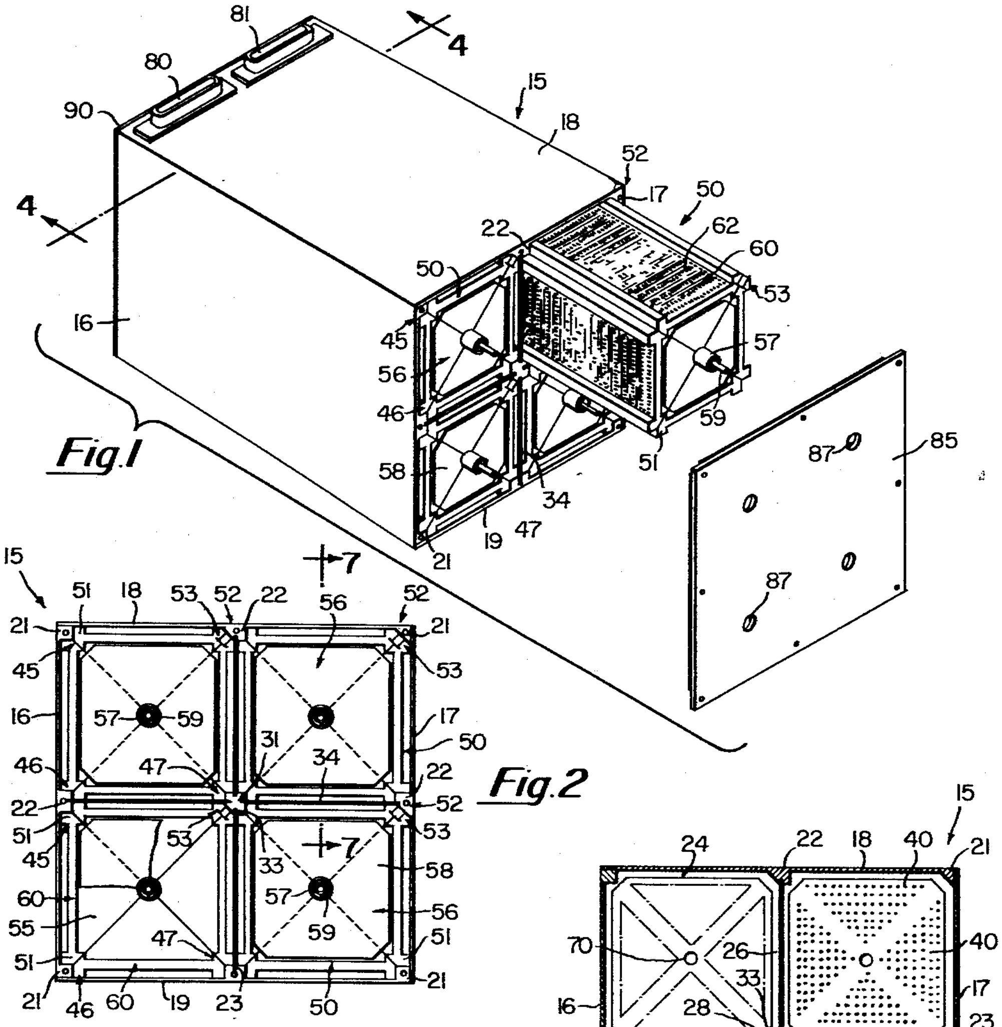
FIG. 1 is a partly exploded perspective view of the housing showing the electrical modules packaged therein, but with one module partially extending out of the housing more clearly to show its exterior.
FIG. 2 is an elevational view of the front or right hand end of the assembly, as seen in FIG. 1, with the front end wall removed.
Figure 3:
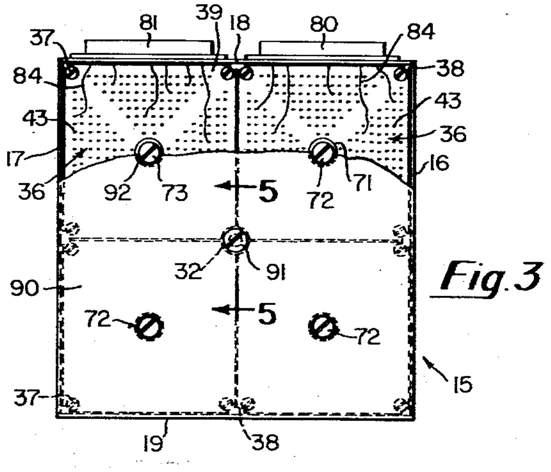
FIG. 3 is an end elevational view of the rear or left hand end of the assembly with the rear cover broken away to show a portion of the interior construction.
Figure 10:
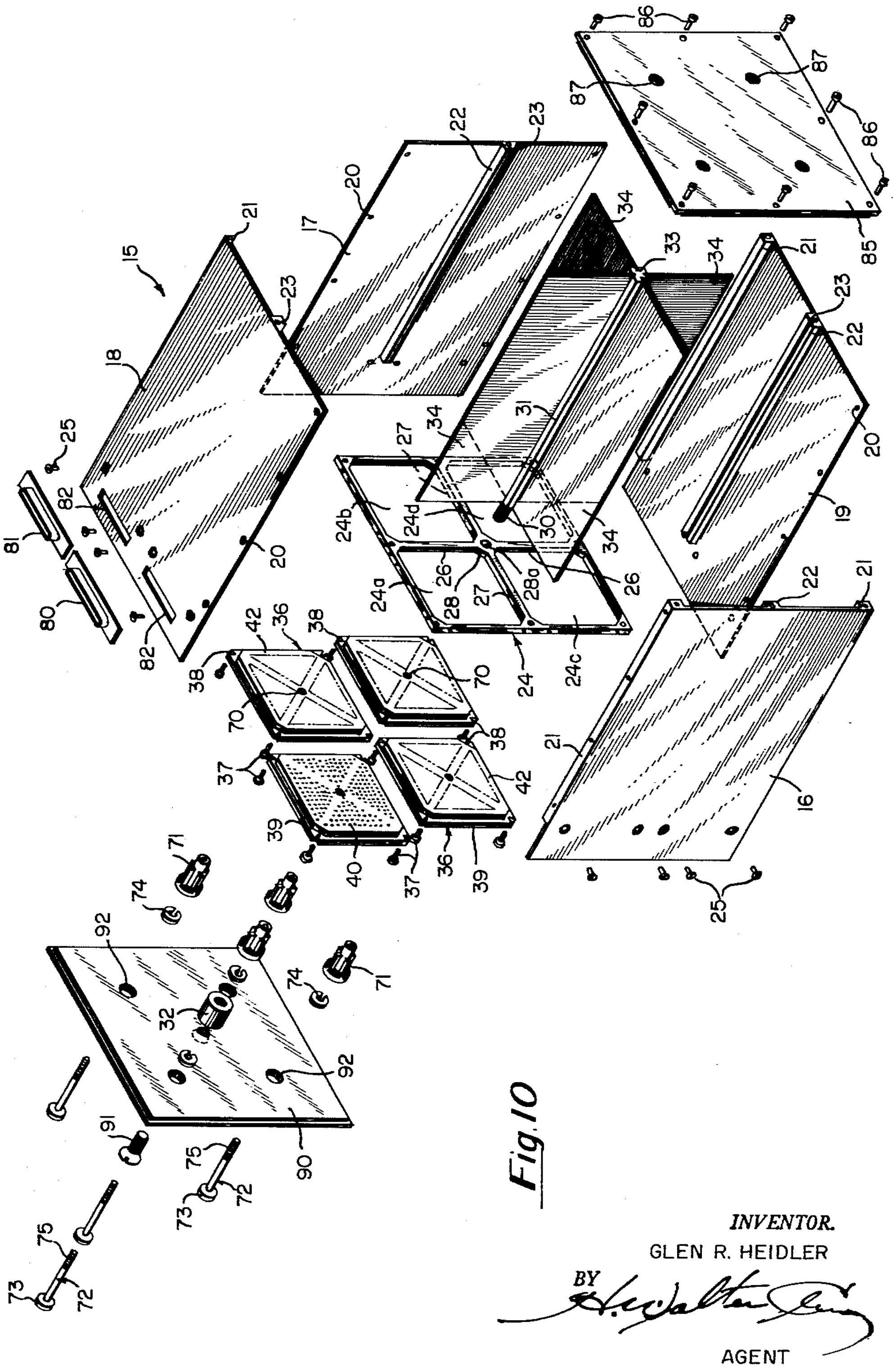
FIG. 10 is an exploded perspective view of the housing showing the details of its novel construction.

Now with more detailed reference to the drawings and particularly to FIGS. 1 and 10, it is seen that the housing 15, exemplifying the preferred form of the invention, comprises four outer walls including left, right, top and bottom walls 16, 17, 18 and 19 respectively. The walls are longer than they are wide and are assembled to form a substantially rectangularly shaped enclosure of square cross section, see FIG. 2. The walls may be formed in any convenient manner and of any suitable material, but in this form of the invention they are constructed of thin aluminum for light weight. They are secured to each other with machine screws (not shown) which pass through apertures 20 to be threaded into rails 21 formed integrally with an extending along opposite edges of the housing walls, as shown in FIG. 10. Also formed integrally with the walls intermediate the opposite edges thereof are rails 22, each formed with a longitudinal groove or slot 23 running throughout its length. It is understood, of course, that the rails could be separate pieces suitably secured to the walls.

Figure 5:
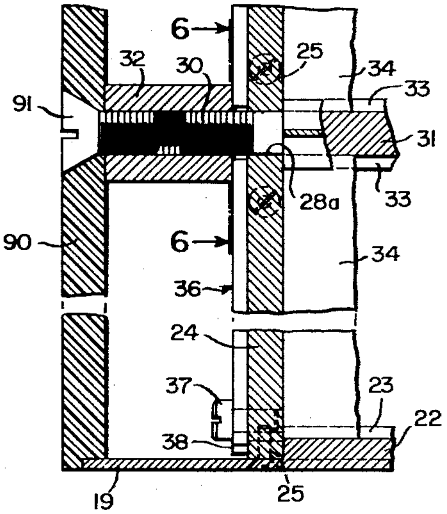
FIG. 5 is a fragmentary sectional view taken along line 5—5 of FIG. 3 with parts broken away.

Rails 21 and 22 extend from the front edge (on the right) to a point adjacent to but spaced from the rear edge of the walls where they abut a framing member 24 secured to the walls at that position by screws 25, see FIG. 5. Frame 24 includes integrally formed cross members 26 and 27 intermediate the outer walls of the frame and dividing the area defined by the frame into four equal framed areas **24*a*, 24*b*, 24*c*, and 24*d*. An enlarged central portion 28, where cross members 26 and 27 meet, is provided with an aperture 28*a* through which the threaded end 30 of a centrally positioned post 31 passes to receive a sleeve nut 32 for securing the post in a central position extending through the housing co-extensively with rails 21 and 22. The post is of generally square cross section with its flat sides facing the walls of the housing and each provided with a slot 33 aligned with the slots 23 in rails 22** on the housing walls.

The area of the housing in front of frame 24 is divided into four elongated module receiving compartments by means of thin partitions 34 the edges of which are received within slots 23 and 33. The partitions also provide support means for post 31 throughout its length, and simultaneously—by a judicious choice of material from which they are made—provide electrical shielding between modules in the compartments.

Figure 6:
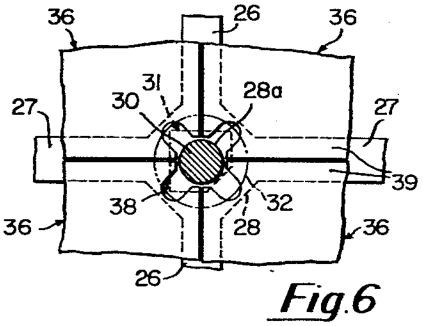
FIG. 6 is a fragmentary sectional view taken along the line 6—6 of FIG. 5.
Figure 7:
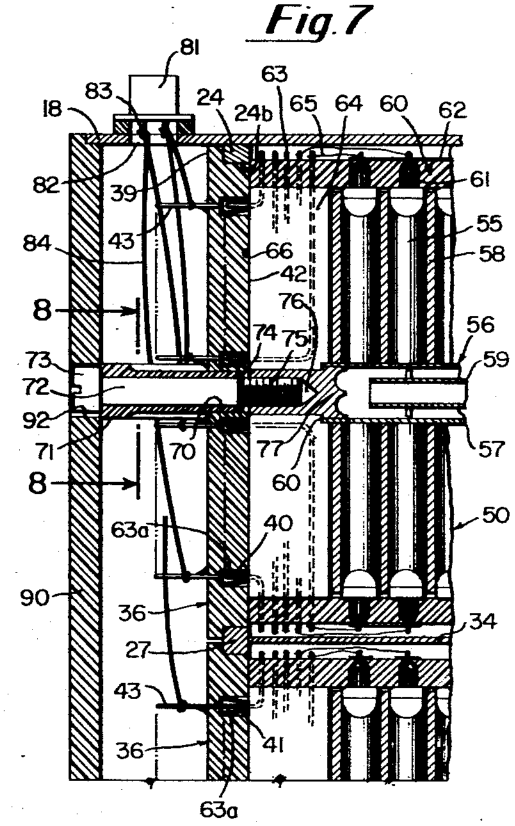
FIG. 7 is a fragmentary sectional view taken along the line 7—7 of FIG. 2.
Figure 9:
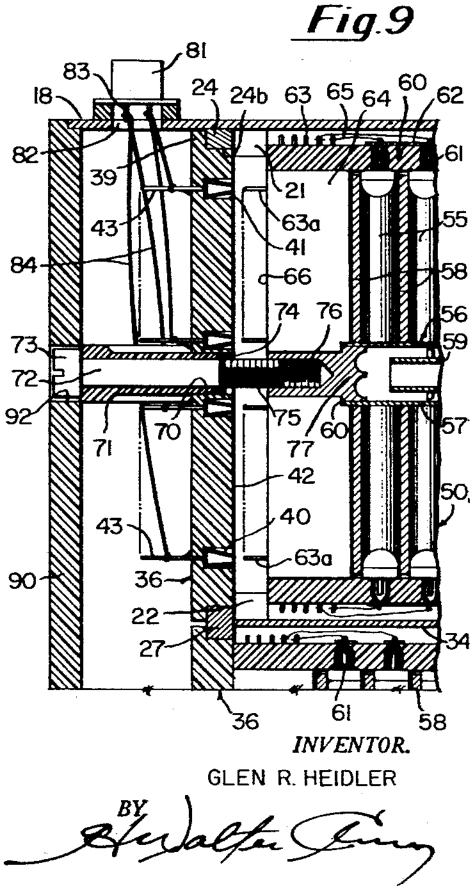
FIG. 9 is a view similar to FIG. 7 but showing an operational condition of the assembly during insertion of one of the circuit modules.

Still with reference to FIG. 1, also to FIGS. 7 and 9, it will be seen that a panel 36 is secured in each of the framed areas **24*a*–24*d* of frame 24 by means of screws 37 extending through notches 38 at the outer three corners of a flange portion 39, and threaded into the frame, see FIG. 5 also. The inner corners of the panel flanges also are notched, but this is because the panels are produced as a production item and may be fitted within any of the framed areas without alignment problems. At the same time, as seen in FIG. 6, the notches in the inner corners do provide clearance for the threaded end 30 of center post 31 to pass between the panels for securement thereto of the sleeve nut 32 which abuts the panel inner corners thus to secure them against the enlarged central portion 28 of the frame 24**. It is to be understood that while only four compartments are shown in this embodiment of the invention, this number may be increased—or decreased—if desired, by dividing the framed area into the number of areas corresponding to the number of compartments desired and then dividing the area in front of the frame into the compartments by means of addition center posts and partition walls.

Figure 4:
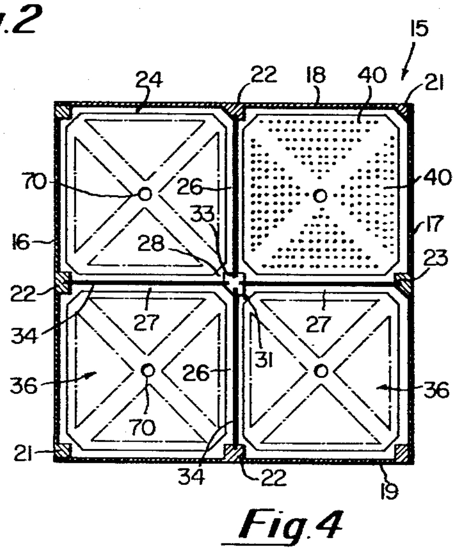
FIG. 4 is a sectional view taken along the line 4—4 of FIG. 1.

Each panel 36, as seen in FIGS. 4, 7 and 9, is provided with a plurality of socket connectors 40 secured in apertures 41 in the inner face 42 of the panel with a connector pin 43 extending through the panel to the outer side. The socket connectors 40 are arranged in triangular quadrants corresponding to to the arrangement of the pin connectors **63*a* on the modules (FIG. 4) in accordance with the Sprude application, whereby when a module is inserted within a compartment its connector pins 63*a* will be received within the socket connectors 40. It is this arrangement which points out the advantages of guide rails 21, 22 on the walls of the housing and as formed by the corners of the center post 31. As described more completely in the above-identified Heidler application, and as seen in FIGS. 1 and 2, the corners 45, 46 and 47 of the modules 50 are provided with similar rails 51 complimentary in shape to the guide rails in the upper left, the lower left and the lower right hand corners of each compartment when looking at the front of the housing. The rails and that portion of the center post in the remaining corner 52 of the compartments—that is the upper right hand corner of each compartment—is cut away at an angle complimentary to the angular shape of the fourth corner 53** of the module, 45° in this case. This corner provides a key way for the modules and serves to properly orient them in their compartments. While the particular corner construction makes it possible to insert a module within a compartment in properly oriented relation, it does not prevent a module from being inserted in the wrong compartment. However, this may easily be prevented by color coding the walls of the compartment and the modules.

Looking at FIGS. 7 and 9, and first to FIG. 9, the leftward end of a module 50 is seen as it is being inserted in a compartment, and with its pin connectors **63*a* just about to enter the socket connectors 40 in a connector plate 36. As mentioned above, each module comprises a novel construction and the one shown here is partially in section to show a portion of its interior construction. A plurality of unique miniature circuit sub-assemblies 55 are nested around a heat exchanger 56, comprising a hollow metallic tube 57 with a plurality of integrally formed fins 58 extending between adjacent sub-assemblies 55 whereby heat generated during operation is picked up from the sub-assemblies by the fins and conducted to the tube 57 from which it may be carried off by a cooling fluid circulating through the tube 57. To facilitate this circulation, the tube 57 may be provided with an inlet tube 59 of smaller diameter than tube 57 and extending substantially therethrough but terminating adjacent the inner end 60. The circuit sub-assemblies 55 and the heat exchanger 56 are enclosed in a housing 60 which is preferably formed in the manner disclosed in the above-identified Sprude application. The sub-assemblies 55 have pin connectors 61 which extend into the housing walls and are conductively interconnected with printed circuitry 62 on the housing walls which interconnects the sub-assemblies in the desired network. The printed circuits are electrically interconnected with pins 63 on a terminal end panel 64 by means of wires 65 connected at one end to the printed circuitry and at the other ends to pins 63. The pins 63 extend through the end wall and project from its outer face 66 as the pins 63*a***.

Figure 8:
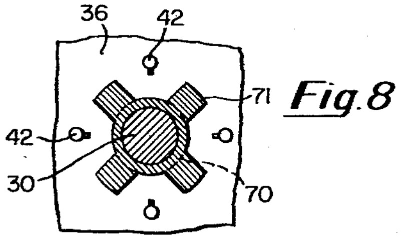
FIG. 8 is a fragmentary sectional view taken along the line 8—8 of FIG. 7.

Each of the connector panels 36 is provided with a central aperture 70 (FIG. 8) having one end of a stud 71 suitably secured therein. Extending through the stud 71 is a screw 72 held captive in the stud by its enlarged head 73 and a C-shaped washer 74 at its opposite end. The threaded inner end 75 of the screw extends into its associated compartment. When a module has been slid along the guide ways until it reaches the position within its compartment, as shown in FIG. 9, the threaded end 75 of the screw 72 engages the threaded bore 76 of a stud 77 forming the end closure for the heat exchanger, while the pins **63*a* are maintained in alignment with the socket connectors 40 in the panel 36. It will be realized now that rotation of the captive screw 72 by a suitable instrument, such as a screw driver, will draw the module fully into its compartment until pins 63*a* are fully engaged within the socket connectors 40, as shown in FIG. 7. It will be understood, of course, that reverse rotation of the captive screw 72 will have the opposite effect, that is forcibly move the module from its associated panel 36 until the pins 63*a* are free from the socket connectors 40 and the screw end 75 from the heat exchanger stud 77**, whereby the module may then easily be withdrawn by hand from its compartment, riding along the guide rails during this movement.

Still with reference to FIGS. 7 and 9, and also to FIG. 1, it will be seen that the housing 15 is provided on the outer surface of one wall—the top wall 18 in the illustrated form of the invention—with an input connector 80 and an output connector 81. These connectors are aligned over elongated apertures 82 in the wall 18 over the compartment formed at the rear of the housing between frame wall 24 and the end of the housing wall, whereby the pins 43 of the connectors 40 in the panels 36 may be conductively connected to the input and output connector pins 83, as by wires 84. The pins 43 may also be connected one with another in the same manner thus to interconnect different modules as called for by the particular network circuitry.

With the four modules 50 completely inserted in their associated compartments, an end wall 85 is secured over the front of the housing, as by screws 86 threaded into the ends of the rails 21 and 22. The wall is provided with apertures 87 to permit the outer ends of the heat exchanger tubes 57 and 59 to extend to the exterior of the assembly for attachment to associated heat exchanging apparatus for circulating the cooling medium through the heat exchanger. The opposite end of the assembly is also provided with a cover member 90 secured thereto by screw 91 (FIG. 5) extending through the cover and threaded into the outer end of sleeve nut 32. Apertures 92 are provided in cover 90 to accommodate screw heads 73 (FIG. 7) and expose them for access from the outside of the housing.

Emphasizing some of the novel specific features of the housing construction, it can now be seen that certain of the components of the housing serve multiple purposes. For example, the sleeve nut 32 serves as, (1) a nut for securing the center post 31 to the frame 24, (2) to clamp the inner corners of the panels 36, (3) as a spacer for the end cover 90, and (4) as means cooperating with the screw 91 to secure the cover to the housing. The divider walls 34 serve as (1) a support for the center post 31, and (2) as shielding means between adjacent modules. The frame 24 serves as (1) alignment means for maintaining the squareness of the housing, and (2) means for maintaining the alignment of the module connector pins for interconnection with the socket connectors 40. The housing walls 16, 17, 18 and 19 serve several purposes such as (1) the walls of the housing, (2) maintaining the housing structure as an integrally stressed skin design, (3) providing the rails for guiding and keying the modules within the compartments, and (4) as means for supporting the modules in their aligned position within the compartments. The captive connector screws 72 serve as (1) a common tie point for the whole module assembly, and (2) as means for pulling in and ejecting the modules from their connector panels 36.

From the above description, it will now be understood that the invention is embodied in a unique housing enabling the packaging of miniaturized modular network assemblies into miniature network systems. By way of example, a package of this type, as illustrated in FIG. 1, has been assembled in a housing 4¾" x 4¾" x 7" containing a computer (less input and output) particularly adapted for airborne use. A computer so assembled may include 700 or more of the sub-assemblies 55 and contain approximately 27,000 components.

What is claimed is:

1. An electrical network package for a plurality of elongated electrical circuit modules, each of rectangular cross section and enclosing a plurality of circuit components interconected by leads terminating at connectors disposed on an exterior end wall of said module, comprising: walls forming an elongated housing of rectangular cross section for receiving said modules, each wall provided with a slot; longitudinal partition walls having outer marginal portions positioned in said slots and dividing said housing into a plurality of elongated compartments along its width and into a plurality of compartments along its height, all of rectangular cross section, one for each of said modules; a transverse wall extending across the ends of said compartments and with the housing walls forming a chamber across the ends of said elongated compartments at one end of the housing; first connector means in said transverse wall at the end of each compartment; means for guiding said modules into said compartments in a manner to interconnect their respective connectors and for supporting the inner marginal portions of said partition walls; second connector means on said housing providing input and output connections for said modules, said second connector means having terminals exposed to the interior of said chamber; and electrical conductors within said chamber interconnecting said input and output connectors to said first connector means.

2. A construction according to claim 1 wherein said transverse wall comprises a wall secured across the ends of said compartments and spaced inwardly of one end of said housing, and wherein said transverse wall comprises a framing member secured to the walls of the housing, means dividing said framing member into open areas, one at the end of each elongated compartment, a panel secured in each of said open areas, and wherein said first connector means comprises connectors in each of said panels.

3. A construction according to claim 2 and further including means in each of said panels for engaging said exterior end wall of a module and for forcibly drawing said module fully within its compartment and securing it there.

4. A construction according to claim 3 wherein said means for drawing said modules forcibly within the compartments comprising, a captive screw extending through each of said panels and each having a threaded end extending into a compartment for engagement with a threaded aperture provided in said exterior end wall of said modules.

5. An electrical network package for electrical circuit modules of polygonal cross section and enclosing a plurality of circuit components interconnected by leads terminating at connectors disposed on an exterior end surface of said module, comprising: walls forming a housing; means dividing said housing into compartments one for each of said modules, said dividing means comprising a plurality of rails on the interior surfaces of the housing walls and each provided with a slot, post means extending through the housing spaced from but parallel with the last-mentioned wall surfaces and rails and provided with a plurality of slots each cooperating with one of said rail slots, and partition walls extending between said rails and said post means, each having opposite marginal portions positioned in a rail slot and its cooperating post slot; connector means at the end of each compartment; said rails and said post also providing means for guiding said modules into said compartments in a manner to interconnect their respective connectors; means on said housing providing input and output connections for said modules; and electrical conductors interconnecting said input and output connections to said connector means at the ends of the compartments.

6. An electrical network package for a plurality of electrical circuit modules, each module being of rectangular cross section and enclosing a plurality of circuit components interconnected by leads terminating at connectors disposed on an exterior end surface of said module, comprising: four walls forming a housing rectangular in cross section for receiving said modules; means dividing said housing along its width and height into rectangular compartments similar in shape to said modules, and one for each of said modules; connector means at the end of each compartment; means for guiding said modules into said compartments in a manner to interconnect their respective connectors; said dividing means and said means for guiding said modules into said compartments comprising, a plurality of guide rails extending along said walls, certain of said guide rails provided with an inwardly facing slot, post means extending through said housing parallel to but spaced from said walls and said rails and provided with outwardly facing slots each in line with a cooperating rail slot, and partition walls extending between said slotted rails and said post means with opposite marginal portions positioned in the cooperating slots thereof, said rails and said post means having portions mating with portions of said modules so to guide the modules within said compartments; means on said housing providing input and output connections for said modules; and electrical conductors interconnecting said input and output connectors to said connector means at the ends of the compartments.

7. An electrical network package for a plurality of elongated electrical circuit modules, each of rectangular cross-section and enclosing a plurality of circuit components interconnected by leads terminating at connectors disposed on an exterior end wall of said module, comprising: an elongated housing of rectangular cross-section for receiving said modules; a plurality of guide rails extending along the interior surfaces of the walls of the housing each provided with an inwardly facing slot; an elongated post extending through said housing parallel to but spaced from said walls and said rails and provided with a group of outwardly facing slots each in line with and cooperating with one of said rail slots; partition walls each having opposite marginal portions positioned in and supported by a rail slot and its cooperating post slot; said guide rails, post, and partitions dividing said housing into a plurality of elongated compartments each of rectangular cross-section, one for each of said modules; means forming an end chamber in said housing traversing the ends of said elongated compartments; said last-mentioned means comprising a transverse wall secured across the ends of said compartments spaced inwardly of one end of said housing; said transverse wall comprising a framing member secured to the walls of the housing, means dividing said framing member into a plurality of open areas, one at the end of each elongated compartment, and a panel secured in each of said open areas; first connector means in each panel at the end of each compartment and having portions extending into said end compartment; said post and said guide rails each having portions mating with portions of at least two of said modules for guiding them within their respective said compartments in a manner to interconnect their respective connectors with the associated first connector means; second connector means on said housing providing input and output connections for said modules; and electrical conductors within said end compartment interconecting said input and output connectors to said first connector means.

References Cited in the file of this patent

UNITED STATES PATENTS

| | | |
|---|---|---|
| 2,287,797 | Hanley | June 30, 1942 |
| 2,602,842 | Morris | July 8, 1952 |
| 2,748,321 | Kamm | May 29, 1956 |
| 2,879,455 | Scal | Mar. 24, 1959 |
| 2,880,379 | Stoddart | Mar. 31, 1959 |
| 2,889,493 | Scal | June 2, 1959 |
| 2,894,077 | McCoy | July 7, 1959 |